United States Patent [19]

Madigan

[11] 4,365,055

[45] Dec. 21, 1982

[54] PROCESS FOR PRODUCING SUBSTANTIALLY LINEAR CARBONATE POLYMER

[75] Inventor: Darold L. Madigan, Elk Grove Village, Ill.

[73] Assignee: PPG Industries, Inc., Pittsburgh, Pa.

[21] Appl. No.: 276,753

[22] Filed: Jun. 24, 1981

[51] Int. Cl.³ .............................................. C08G 63/62
[52] U.S. Cl. ..................................... 528/371; 524/405; 524/409; 524/435; 528/372
[58] Field of Search ................................ 528/371, 372

[56] References Cited

U.S. PATENT DOCUMENTS

| | | | |
|---|---|---|---|
| 2,787,630 | 4/1957 | Katz et al. | 260/463 |
| 2,873,291 | 2/1959 | Spiegler | 260/463 |
| 3,112,292 | 11/1963 | Bottenbauch et al. | 260/47 |
| 3,207,814 | 9/1965 | Goldberg | 260/860 |
| 3,334,128 | 8/1967 | Brown | 260/463 |
| 3,382,207 | 5/1968 | Jaquiss | 260/45.7 |
| 3,527,734 | 9/1970 | Matzner | 528/371 |
| 3,688,001 | 8/1972 | Exner et al. | 260/463 |
| 3,700,625 | 10/1972 | Brady et al. | 260/45.75 R |
| 3,763,644 | 10/1973 | Jackson et al. | 57/140 BY |
| 3,779,984 | 12/1973 | Exner et al. | 260/45.7 R |
| 3,804,792 | 4/1974 | Pews | 260/31.6 |
| 3,823,175 | 7/1974 | Exner et al. | 260/463 |
| 3,855,277 | 12/1974 | Fox | 260/45.7 R |
| 4,012,406 | 3/1977 | Buysch et al. | 260/463 |
| 4,085,129 | 4/1978 | Semler et al. | 260/463 |

FOREIGN PATENT DOCUMENTS 2641 6/1979 European Pat. Off. .
2228257 1/1973 Fed. Rep. of Germany .

OTHER PUBLICATIONS

Wertheim, Textbook of Organic Chemistry, 3rd Ed., McGraw-Hill, N.Y. (1951) pp. 682-687.
SRI International-1982 Directory of Chemical Producers, U.S.A. Menlo Park, CA, pp. 871 and 987.
Sarel et al., Journal of Organic Chemistry, vol. 24, pp. 1873-1877 (1959).
Schnell, Chemistry and Physics of Polycarbonates, Interscience Publishers (1964), pp. 9-12 and 72.
Ludwig et al., Journal of the American Chemical Society, vol. 73, pp. 5774-5781 (1951).
Sarel et al., Journal of the American Chemical Society, vol. 80, pp. 4596-4599 (1958).

Primary Examiner—H. S. Cockeram
Attorney, Agent, or Firm—George D. Morris

[57] ABSTRACT

In the preparation of a substantially linear carbonate polymer wherein carbonic dihalide is introduced to a substantially anhydrous solution comprising at least one substituted or unsubstituted 1,3-propanediol, the coproduction of cyclic carbonate is reduced by the presence in the solution of a catalytic amount of nitrogen-containing, hydrohalide salt-forming, thermally regenerable organic catalyst. The preferred carbonic dihalide is phosgene and the preferred catalyst is pyridine.

22 Claims, No Drawings

PROCESS FOR PRODUCING SUBSTANTIALLY LINEAR CARBONATE POLYMER

When carbonic dihalide and substituted or unsubstituted 1,3-propanediol are reacted in the presence of large quantities of hydrohalide salt forming catalyst, such as pyridine, there is a considerable tendency to form cyclic carbonate having a six-membered ring rather than substantially linear carbonate polymer. Inasmuch as the cylic carbonate possesses many properties, as for example, molecular weight, vapor-pressure, solubility and the like, which differ considerably from those of the substantially linear carbonate polymer molecules, the presence of more than a few percent by weight of the cyclic carbonate can unduly affect the properties of the polymer.

The present invention provides a process which produces substantially linear carbonate polymer while maintaining the production of cyclic carbonate at low levels. Accordingly, the present invention contemplates a process for producing substantially linear carbonate polymer comprising (a) introducing carbonic dihalide to a substantially anhydrous solution comprising inert organic solvent, at least one substituted or unsubstituted 1,3-propanediol and a catalytic amount of nitrogen-containing, hydrohalide salt forming, thermally regenerable organic catalyst, while the temperature of the solution is in the range of from about 70° C. to about 225° C., and (b) removing hydrogen halide from the vicinity of the solution.

The reaction may be conducted either continuously or batchwise, but batchwise reactions are more usual.

The two reactants are generally ultimately employed in about equimolar amounts although an excess of either is acceptable. An especially useful method comprises ultimately introducing from about 0.9 molar part to about 1.1 molar part carbonic dihalide per molar part of the 1,3-propanediol employed.

Examples of carbonic dihalides which may be used include phosgene, bromophosgene and bromochlorophosgene. The preferred carbonic dihalide is phosgene. Mixtures of carbonic dihalides may be used where desired.

The 1,3-propanediol may be unsubstituted or it may be substituted with any of a wide variety of substituents which do not seriously interfere with the polymer-producing reaction. Methyl is the most common substituent used in any or all of the four available 1,1-positions and 3,3-positions; however, it is preferred that all of these four positions be unsubstituted. A wider variety of substituents may be used in one or both of the 2,2-positions than in the 1,1-positions or the 3,3-positions. Examples of sustituents which may be attached to the 2-carbon include lower alkyl containing from 1 to about 5 carbon atoms, as for example, methyl, ethyl, propyl, isopropyl, butyl, pentyl and isopentyl. Of these, methyl and ethyl are preferred. Examples of other substituents include chloromethyl, bromomethyl, 2-chloroethyl, 2-bromoethyl, phenyl, tolyl, xylyl, nitrile, nitromethyl, methoxy, ethoxy, phenoxy, methoxymethyl and phenoxymethyl.

Examples of 1,3-propanediols which may be used include 1,3-propanediol, 1,3-butanediol, 2,4-pentanediol, 2,2-dimethyl-1, 3-propanediol, 2-methyl-2-propyl-1, 3-propanediol, 2,2-diethyl-1, 3-propanediol, 2-ethyl-2-isoamyl-1, 3-propanediol, 2-methyl-2-phenyl-1, 3-propanediol, 2-ethyl-2-phenyl-1, 3-propanediol, 2,2-bis(chloromethyl)-1,3-propanediol, 2,2-bis(bromomethyl)-1, 3-propanediol, 2,2-bis(nitromethyl)-1,3-propanediol, 2,2-bis(methoxymethyl)-1,3-propanediol, 2,2-bis(phenoxymethyl)-1, 3-propanediol and 2,2-diphenyl-1, 3-propanediol. The preferred 1,3-propanediols are 1,3-propanediol, 2,2-dimethyl-1,3-propanediol and 2,2-bis(bromomethyl)-1,3-propanediol.

Mixtures of 1,3-propanediols may be used where desired.

Exemplary catalysts which may be used include nitrogen-containing heterocyclic organic catalysts such as pyridine, di(methylamino)pyridine, imidizole, 2,6-lutidine and 2,4,6-collidine. Mixtures of catalysts may be used where desired. The preferred catalyst is pyridine.

The molar ratio of the catalyst to the 1,3-propanediol present in the solution at the time of carbonic dihalide introduction is normally in the range of from about 0.005:1 to about 0.05:1. It is preferred that the molar ratio be in the range of from about 0.02:1 to about 0.04:1.

Substantially any solvent or mixture of solvents may be used so long as they are inert to the reactants and the reaction products at the reaction temperature and below. Examples of suitable solvents are the aromatic hydrocarbon solvets such as benzene, toluene and xylene. Chlorinated aliphatic solvents such as methylene chloride, chloroform carbon tetrachloride, trichloroethylene and perchloroethylene may be used. Similarly, chlorinated aromatic solvents such as chlorobenzene, o-dichlorobenzene, and o-chlorortoluene are useful. The preferred inert solvents are toluene and xylene, while xylene is especially preferred.

The weight ratio of inert solvent to the dissolved solids employed is subject to wide variation. Generally, the amount of solvent should be sufficient to solvate the reactants and the product polymer at the reaction temperature. The weight ratio of inert solvent to the dissolved solids is usually in the range of about about 0.5:1 to about 100:1. From about 1:1 to about 3:1 is preferred.

The reaction is generally conducted at ambient atmospheric pressure although greater or lesser pressures may be used where desired. For example, when a low boiling solvent such as methylene chloride is used, it may be advantageous in some instances to use pressures greater than atmospheric to raise the boiling point.

During introduction of the carbonic dihalide, the temperature of the solution is in the range of from about 70° C. to about 225° C. It is preferred that the temperature be in the range of from about 80° C. to about 100° C.

According to one embodiment of the invention, carbonic dihalide is gradually introduced to a solution comprising the inert organic solvent, the 1,3-propanediol and the catalyst while the solution is at reflux.

In the preferred embodiment, carbonic dihalide is gradually introduced to a solution comprising the inert organic solvent, the 1,3-propanediol and the catalyst while the temperature of the solution is in the range of from about 80° C. to about 90° C. but below the reflux temperature. After the introduction has been substantially completed, the temperature of the solution is raised to a reflux temperature in the range of from above 90° C. to about 225° C. It is especially preferred that the reflux temperature be in the range from about 110° C. to about 140° C.

Following preparation, the polymer may be recovered from the reaction mixture by removing the solvent by distillation or by admixing the reaction mixture with a liquid in which the polymer is substantially insoluble but which is miscible with the inert solvent. Water or methanol may ordinarily be used for this purpose. The precipitated polymer may then be filtered, washed and dried.

The polymer may be used alone or it may be admixed with other materials such as other polymers, zinc borate, boric acid, ferric oxide, antimony trioxide, antimony pentoxide, plasticizers, pigments, dyes, tints, resinous pigment dispersants, grinding vehicles or the like. The listing of such optional ingredients is by no means exhaustive. These and other ingredients may be employed in their customary amounts for their customary purposes so long as they do not seriously interfere with good polymer formulating practice.

The linear carbonate polymer and compositions containing such polymer find many uses. Typically, they may be extruded into fibers, films or other shapes, or molded or shaped into substantially any form. Where the polymers of the composition are soluble in solvent or are dispersible in liquid nonsolvents such as water, organic nonsolvent or miscible systems of water and organic liquid, the composition may be employed in coating compositions.

In the illustrative examples which follow, all parts are parts by weight and all percentages are percentages by weight unles otherwise specified.

EXAMPLE I

A twelve liter, five-necked flask equipped with an agitator, a thermometer, a water-cooled condenser, a Dean Stark trap and an electric heating mantle is charged with 2618 grams (10 moles) of 2,2-bis(-bromomethyl)-1,3-propanediol and 5 liters of toluene. The charged materials are heated to reflux and 25 milliliters of condensate is removed to dry the charged materials. The temperature of the remaining materials is adjusted to 80° C. and 20 grams (0.253 mole) pyridine is added and the water-cooled condenser is replaced with an isopropanol-solid carbon dioxide condenser. While maintaining the reaction mixture at about 80° C., 1030 grams (10.4 moles) of phosgene is added below the surface of the liquid at a rate of 4 grams per minute. When the addition is completed, the temperature of the reaction mixture is held at 80° C. to 90° C. for 2¾ hours. The isopropanol-solid carbon dioxide condenser is replaced with a water-cooled condenser and the reaction mixture is heated to reflux (114° C.). The reaction mixture is held at reflux for 7 hours. The product is concentrated to 2 liters by distillation and removal of solvent through a Dean Stark trap. In portions, the reaction mixture is poured into methanol and mixed in a blender. A total of 4 gallons of methanol is used. A fine white powder is isolated by filtration and dried 6 hours at 80° C. The dry weight yield is 2580.4 grams or 89.7 percent of theory. The product is identified by liquid chromatography as about 97 percent poly[2,2-bis(bromomethyl)trimethylene carbonate] and about 2 percent cyclic carbonate. The melting point as determined by Differential Scanning Calorimetry is 112° C. The result of bromine analysis is: Found, 56.72 percent by weight. From liquid chromatography using two Zorbax PSM 60 columns in series and refractive index detectors, the following are determined:
  Number Average Molecular Weight: 5259
  Weight Average Molecular Weight: 16667
  Sedimentation Average Molecular Weight: 21808

A sample of the product is subjected to thermogravimetric analysis using a 10° C./minute heating rate in a flowing nitrogen atmosphere. The results are a 1 percent weight loss at 254° C. and a 5 percent weight loss at 284° C. The product is useful as a fire retardant polymer.

EXAMPLE II

A one liter, four-necked flask equipped with an agitator, a thermometer, a water-cooled condenser and an electric heating mantle is charged with 262 grams (1 mole) of 2,2-bis(bromomethyl)-1,3-propanediol, 500 milliliters of xylene and 4 grams (0.05 mole) pyridine. The charged materials are heated to 80° C. to product a clear, slightly yellow solution. The water-cooled condenser is replaced with an isopropanol-solid carbon dioxide condenser. While maintaining the reaction mixture at 80° C., 102.5 grams of phosgene is added below the surface of the liquid at a rate of 1 gram per minute. When the addition is completed, the temperature of the reaction mixture is held at 80° C. to 85° C.for about about one hour. The isopropanol-solid carbon dioxide condenser is replaced with a water-cooled condenser and the reaction mixture is heated to reflux (138° C.). The reaction mixture is held at reflux for 3 hours. A Dean Stark trap is added and 380 milliliters of xylene is removed by distillation. The remaining reaction mixture is poured into a blender containing one liter of methanol while stirring. An additional 500 milliliters of methanol is added. The precipitate is isolated by filtration, dried overnight at 80° C. and dried for 8 hours at 110° C. The dry weight yield is 264 grams or 91.6 percent of theory. The product, poly[2,2-bis(bromomethyl) trimethylene carbonate], has a melting range of from 121° C. to 130° C.

EXAMPLE III

A one liter, four-necked flask equipped with an agitator, a thermometer, a water-cooled condenser and an electric heating mantle is charged with 262 grams (1 mole) of 2,2-bis(bromomethyl)-1,3-propanediol, 500 milliliters of xylene and 4 grams (0.05 mole) pyridine. The charged materials are heated to reflux (130° C.). While maintaining reflux, 80.4 1 grams of phosgene is added below the surface of the liquid over a period of 11 hours. The reaction mixture is then allowed to cool to room temperature overnight. The reaction mixture is then quickly heated to reflux and while maintaining reflux, 52.4 grams of phosgene is added below the surface of the liquid over a period of 8 hours. When the addition is completed, the reaction mixture is poured into a blender containing 1.5 liters of methanol while stirring. The precipitate is isolated by filtration and dried. The dry weight yield is 265.8 grams or 92.3 percent of theory. The product, poly[2,2-bis(bromomethyl)trimethylene carbonate], has a melting range of from 110° to 125° C.

EXAMPLE IV

This comparative example illustrates the effect of using an approximately stoichiometric amount of pyridine.

A 500 milliliter, four-necked flask equipped with an agitator, a thermometer, an isopropanol-solid carbon dioxide condenser is charged with 65.5 grams (0.25 mole) of 2,2-bis(bromomethyl-1,3-propanediol, 43.5 grams (0.55 mole) pyridine and 200 milliliters of xylene. Next, 27.7 grams (0.28 mole) of phosgene is added below the surface of the liquid at a rate of one gram per minute. During the addition, the temperature of the reaction mixture increases from 20° C. to 55° C. Upon completion of the addition, the reaction mixture is washed with 200 milliliters 5% hydrochloric acid and the organic layer is separated from the aqueous layer. The organic layer is washed with 200 milliliters water, separated from the aqueous layer and dried over magnesium sulfate. After filtering, the resulting clear, colorless liquid is bottled. On standing the liquid turns hazy. Liquid chromatography shows that the product, on a xylene-free basis, contains 33 weight percent [2,2-bis(bromomethyl)trimethylene carbonate] and 67 weight percent cyclic carbonate.

I claim:

1. A process for producing substantially linear carbonate polymer comprising:
   a. introducing carbonic dihalide to substantially anhydrous solution comprising inert organic solvent, at least one substituted or unsubstituted 1,3-propanediol and a catalytic amount of nitrogen-containing, hydrohalide salt-forming, thermally regenerable organic catalyst, while the temperature of said solution is in the range of from about 70° C. to about 225° C.; and
   b. removing hydrogen halide from the vicinity of said solution.

2. The process of claim 1 wherein the molar ratio of said catalyst to said 1,3-propanediol present in said solution at the time of said carbonic dihalide introduction is in the range of from about 0.005:1 to about 0.05:1.

3. The process of claim 1 wherein the molar ratio of said catalyst to said 1,3-propanediol present in said solution at the time of said carbonic dihalide introduction is in the range of from about 0.02:1 to about 0.04:1.

4. The process of claim 1 wherein said carbonic dihalide is phosgene.

5. The process of claim 1 wherein said catalyst is pyridine, di(methylamino)pyridine, imidazole, 2,6-lutidine, 2,4,6-collidine or a mixture thereof.

6. The process of claim 1 wherein said catalyst is pyridine.

7. The process of claim 6 wherein said carbonic dihalide is phosgene.

8. The process of claim 1 wherein said carbonic dihalide and said 1,3-propanediol are ultimately employed in about equimolar amounts.

9. The process of claim 1 wherein from about 0.9 molar part to about 1.1 molar part of said carbonic dihalide is ultimately introduced per molar part of said 1,3-propanediol employed.

10. The process of claim 1 wherein said 1,3-propanediol is 1,3-propanediol.

11. The process of claim 1 wherein said 1,3-propanediol is 2,2-bis(bromomethyl)-1,3-propanediol.

12. The process of claim 1 wherein said 1,3-propanediol is 2,2-dimethyl-1,3-propanediol.

13. The process of claim 1 wherein said inert organic solvent is toluene.

14. The process of claim 1 wherein said inert organic solvent is xylene.

15. The process of claim 1 wherein the weight ratio of said inert solvent to dissolved solids is in the range of from about 0.5:1 to about 100:1.

16. The process of claim 1 wherein the weight ratio of said inert solvent to dissolved solids is in the range of from about 1:1 to about 3:1.

17. The process of claim 1 wherein said temperature of said solution is in the range of from about 80° C. to about 100° C.

18. The process of claim 1 wherein said carbonic dihalide is gradually introduced to said solution while said solution is at reflux.

19. The process of claim 18 wherein said carbonic dihalide is phosgene.

20. The process of claim 1 wherein said carbonic dihalide is gradually introduced to said solution while the temperature of said solution is in the range of from about 80° C. to about 90° C. but below the reflux temperature, and wherein after said introduction has been substantially completed, the temperature of said solution is raised to a reflux temperature in the range of from above 90° C. to about 225° C.

21. The process of claim 20 wherein said reflux temperature is in the range of from above 110° C. to about 140° C.

22. The process of claim 20 wherein said carbonic dihalide is phosgene.

* * * * *